(12) United States Patent
Agner et al.

(10) Patent No.: US 10,126,073 B2
(45) Date of Patent: Nov. 13, 2018

(54) CORRUGATED FIN AND METHOD FOR PRODUCING IT

(71) Applicant: MAHLE International GmbH, Stuttgart (DE)

(72) Inventors: Carolin Agner, Kernen im Remstal (DE); Bjoern Haller, Sindelfingen (DE); Jonas Kilian, Stuttgart (DE); Jens Ruckwied, Stuttgart (DE); Florian Schmidt, Stuttgart (DE); Eberhard Pantow, Winnenden (DE); Gerd Schleier, Schwalkheim (DE)

(73) Assignee: MAHLE International GmbH, Stuttgart (DE)

( * ) Notice: Subject to any disclaimer, the term of this patent is extended or adjusted under 35 U.S.C. 154(b) by 304 days.

(21) Appl. No.: 14/513,384

(22) Filed: Oct. 14, 2014

(65) Prior Publication Data

US 2015/0096728 A1    Apr. 9, 2015

Related U.S. Application Data

(63) Continuation of application No. PCT/EP2013/057587, filed on Apr. 11, 2013.

(30) Foreign Application Priority Data

Apr. 11, 2012 (DE) .................. 10 2012 205 916

(51) Int. Cl.
*F28F 3/02* (2006.01)
*F28F 1/14* (2006.01)
(Continued)

(52) U.S. Cl.
CPC ............ *F28F 3/02* (2013.01); *B21D 13/04* (2013.01); *B23P 15/26* (2013.01); *F28F 1/126* (2013.01); *Y10T 29/4935* (2015.01)

(58) Field of Classification Search
CPC ........ F28F 1/28; F28F 1/26; F28F 1/14; F28F 3/02; F28D 1/0316; F28D 1/0358
(Continued)

(56) References Cited

U.S. PATENT DOCUMENTS

| 2,252,209 A | * | 8/1941 | Schank | B21D 53/04 |
| | | | | 29/890.03 |
| 2,252,211 A | * | 8/1941 | Seemiller | F28F 1/126 |
| | | | | 165/151 |

(Continued)

FOREIGN PATENT DOCUMENTS

| CN | 101551209 A | 10/2009 |
| CN | 101600523 A | 12/2009 |

(Continued)

OTHER PUBLICATIONS

Chinese Office Action for Chinese Application No. 201380019347.4 dated Mar. 23, 2016 with English translation.

(Continued)

*Primary Examiner* — David Teitelbaum
*Assistant Examiner* — Harry Arant
(74) *Attorney, Agent, or Firm* — Muncy, Geissler, Olds & Lowe, P.C.

(57) ABSTRACT

A corrugated fin, in particular for a heat exchanger, having a substantially corrugated design, having a plurality of fin surfaces, wherein adjoining fin surfaces are connected to one another by means of a fin arch in such a way that a medium can flow through an intermediate space between adjoining fin surfaces, wherein the fin surfaces are arranged at an angle with respect to one another perpendicularly with respect to a throughflow direction for the medium, wherein the fin surface has at least one bulge which protrudes out of the plane of the fin surface, wherein the extent of the bulge in a direction perpendicularly with respect to the air through- (Continued)

flow direction is smaller than the extent of the fin surface in said direction.

15 Claims, 12 Drawing Sheets

(51) Int. Cl.
  *F28F 1/12* (2006.01)
  *B21D 13/04* (2006.01)
  *B23P 15/26* (2006.01)

(58) Field of Classification Search
  USPC .......................................... 165/182, 152, 151
  See application file for complete search history.

(56) References Cited

U.S. PATENT DOCUMENTS

| | | | |
|---|---|---|---|
| 2,592,950 A | | 4/1952 | Przyborowski |
| 6,546,774 B2 | | 4/2003 | Granetzke |
| 8,424,592 B2* | | 4/2013 | Meshenky ............. B21D 13/08 165/151 |
| 8,516,699 B2 | | 8/2013 | Grippe et al. |
| 8,561,451 B2 | | 10/2013 | Opferkuch et al. |
| 2007/0012430 A1* | | 1/2007 | Duke ....................... F28F 3/027 165/109.1 |
| 2007/0107882 A1 | | 5/2007 | Geskes et al. |
| 2009/0025916 A1 | | 1/2009 | Meshenky et al. |
| 2009/0250201 A1 | | 10/2009 | Grippe et al. |
| 2010/0024508 A1 | | 2/2010 | Opferkuch et al. |
| 2012/0024511 A1 | | 2/2012 | Harada |

FOREIGN PATENT DOCUMENTS

| | | | | |
|---|---|---|---|---|
| DE | 31 34 401 C1 | 5/1984 | | |
| DE | 20 2004 020 294 U1 | 6/2006 | | |
| DE | 10 2008 015 064 A1 | 9/2008 | | |
| DE | 202007017501 U1 * | 4/2009 | ............. | D06F 58/24 |
| DE | 20 2007 017 501 U1 | 5/2009 | | |
| DE | 10 2009 015 849 A1 | 12/2009 | | |
| EP | 1 557 627 A1 | 7/2005 | | |
| EP | 2 117 742 B1 | 10/2010 | | |
| FR | 1 388 772 A | 2/1965 | | |
| JP | S 55-54787 U1 | 4/1980 | | |
| JP | H 04-138568 U | 12/1992 | | |
| JP | 2005-500167 A | 1/2005 | | |
| JP | 2007-510122 A | 4/2007 | | |
| JP | 2012-026407 A | 2/2012 | | |

OTHER PUBLICATIONS

Chinese Office Action for Chinese Application No. 201380019347.4 dated Mar. 21, 2017 with English translation.

Japanese Office Action for Japanese Appication No. 2015-504954 dated Jan. 18, 2017 with English translation.

* cited by examiner

CORRUGATED FIN AND METHOD FOR PRODUCING IT

This nonprovisional application is a continuation of International Application No. PCT/EP2013/057587, which was filed on Apr. 11, 2013, and which claims priority to German Patent Application No. DE 10 2012 205 916.4, which was filed in Germany on Apr. 11, 2012, and which are both herein incorporated by reference.

BACKGROUND OF THE INVENTION

Field of the Invention

The present invention relates to a corrugated fin and to a method for the production thereof and to a heat exchanger having such a corrugated fin.

Description of the Background Art

Corrugated fins are known in the conventional art for use in heat exchangers to improve the heat transfer. In this regard, corrugated fins are known, for example, for the air-side heat transfer, which are arranged substantially wave-shaped or zigzag-shaped folded back and forth between lateral sides of tubes, so that a medium can flow in the intermediate spaces of the fin. In this regard, corrugated fins have become known in which adjacent fin surfaces, connected to one another by means of a fin arch, are parallel to one another or are arranged at an acute angle to one another. In this regard, the fin arch can be an arch which is continuous in the flow direction of the medium and lies against a tube side surface or it can be formed as an offset arch, which is divided into intervals and is offset.

Such corrugated fins have become known, for example, from DE 602 03 721 T2, which corresponds to U.S. Pat. No. 6,546,774. In these corrugated fins with parallel fin surfaces, the possibility of introducing additional turbulence-generating elements in the side surfaces is limited, because the corrugated rollers would again destroy these during the rolling of the parallel side surfaces.

DE 10 2009 015 849 A1, which corresponds to U.S. Pat. No. 8,516,699, discloses a corrugated fin in which the side surfaces have dimples which extend up to the fin arch and deform it to form a wavy contour.

SUMMARY OF THE INVENTION

It is therefore an object of the present invention to provide a corrugated fin and a heat exchanger having a corrugated fin, both of which are improved compared with the conventional art and are nevertheless more simple to produce.

DE 10 2008 015 064 A1, which is incorporated herein by reference, discloses a corrugated fin with fin surfaces which are oriented perpendicular to one another and are deformed inwardly by deformations.

An exemplary embodiment provides a corrugated fin, particularly for a heat exchanger, with a substantially corrugated design, having a plurality of fin surfaces, whereby adjacent fin surfaces are connected to one another by means of a fin arch in such a way that a medium can flow through an intermediate space between adjacent fin surfaces, whereby the fin surfaces are arranged at an angle with respect to one another perpendicular to a throughflow direction for the medium, whereby a fin surface has at least one bulge which protrudes out of the plane of the fin surface, whereby the extent of the bulge in a direction perpendicular to the air throughflow direction is smaller than the extent of the fin surface in this direction. This means that the bulge in the direction perpendicular to the air throughflow direction does not protrude relative to a vertical line, defined by the end regions of the fin surface. The bulge therefore does not enter a spatial region which is defined by the fin arch and the space, defined for this purpose perpendicular to the air throughflow direction, or surface region.

In an embodiment, the bulge can be spaced apart from an end region of the fin surface, which is adjacent to a fin arch, or also from both end regions of the fin surface, said regions each adjacent to a fin arch. This achieves that the bulge does not enter a spatial region, defined by the fin arch and the space, defined for this purpose perpendicular to the air throughflow direction, or the surface region.

A plurality of bulges can be formed and arranged per fin surface, whereby the bulges of a fin surface protrude toward one side with respect to the plane of the fin surface. This promotes the transfer of heat between the fin and the flowing medium such as, for example, air.

A plurality of bulges can be formed and arranged per fin surface, whereby a first portion of bulges of a fin surface protrude toward a first side and a second portion of bulges toward a second side with respect to the plane of the fin surface. This also promotes the transfer of heat between the fin and a flowing medium.

The first portion of bulges can be formed spaced apart from the second portion of bulges or these touch one another or merge into one another. If the bulges are spaced apart, surface regions of the fin surface that separate the individual bulges from one another, are arranged between bulges. If the bulges merge into each other or touch each other, there are either no surface regions of the fin surface or only a boundary between the individual bulges.

The bulges can have a round or elongated and/or oval contour.

Bulges with an elongated and/or oval contour can have a longitudinal axis, which is arranged at an angle to the throughflow direction.

The angle for all bulges can be the same. This means that the orientation of the bulges in air throughflow direction of at least one fin surface or all fin surfaces is the same.

In an embodiment, the angle for adjacent bulges can be different. Thus, it can be achieved that alternating bulges have different angles. It can be advantageous in this case that each second bulge has the same angle.

In an embodiment, the angle for adjacent bulges can be symmetric relative to a vertical line when viewed in regard to the air direction. This means that, for example, an angle of the first bulge is 45° and the angle of the adjacent bulge is 135°. The angles of the two bulges then add up to 180°.

The bulge can be formed as a corrugated embossing on one or on opposite fin surfaces.

The corrugated embossings on opposite fin surfaces can be formed projecting in the same direction.

The corrugated embossing can extend along the fin surface in the flow direction.

In an embodiment, the corrugated embossing can modulate the fin surface perpendicular to the flow direction.

Also, an arcuate embossing, which surrounds the corrugated embossing above and/or below, can be provided above and/or below the corrugated embossing.

The arcuate embossings can form a band running parallel to the corrugated embossing.

Further, the bulge depth of the corrugated embossings and/or the arcuate embossings can be formed constant or variable over the height of the fin.

In an embodiment, the bulge out of the trapezoidal fin surface in the region of the trapezoid base can be smaller than a bulge in the region of the trapezoid top.

In an embodiment, a bulge into the trapezoidal fin surface in the region of the trapezoid base can be greater than a bulge in the region of the trapezoid top.

The bulge height can be between 60% and 95% of the fin height H, preferably 80%.

Further, a counter-bulge can be formed in at least one or in each trough and/or peak of the corrugated embossing.

In an embodiment, an object a heat exchanger is provided having fluid channels with side surfaces of the fluid channels, with spatial regions between adjacent side surfaces, whereby a top corrugated fin is arranged between adjacent side surfaces such that it lies against one of the side surfaces by means of opposite fin arches.

In an embodiment, a method is provided for producing a corrugated fin, in which bulges proceeding from a band are embossed in the band with a set of rollers and then the flat band is shaped into a corrugated fin by means of a set of rollers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
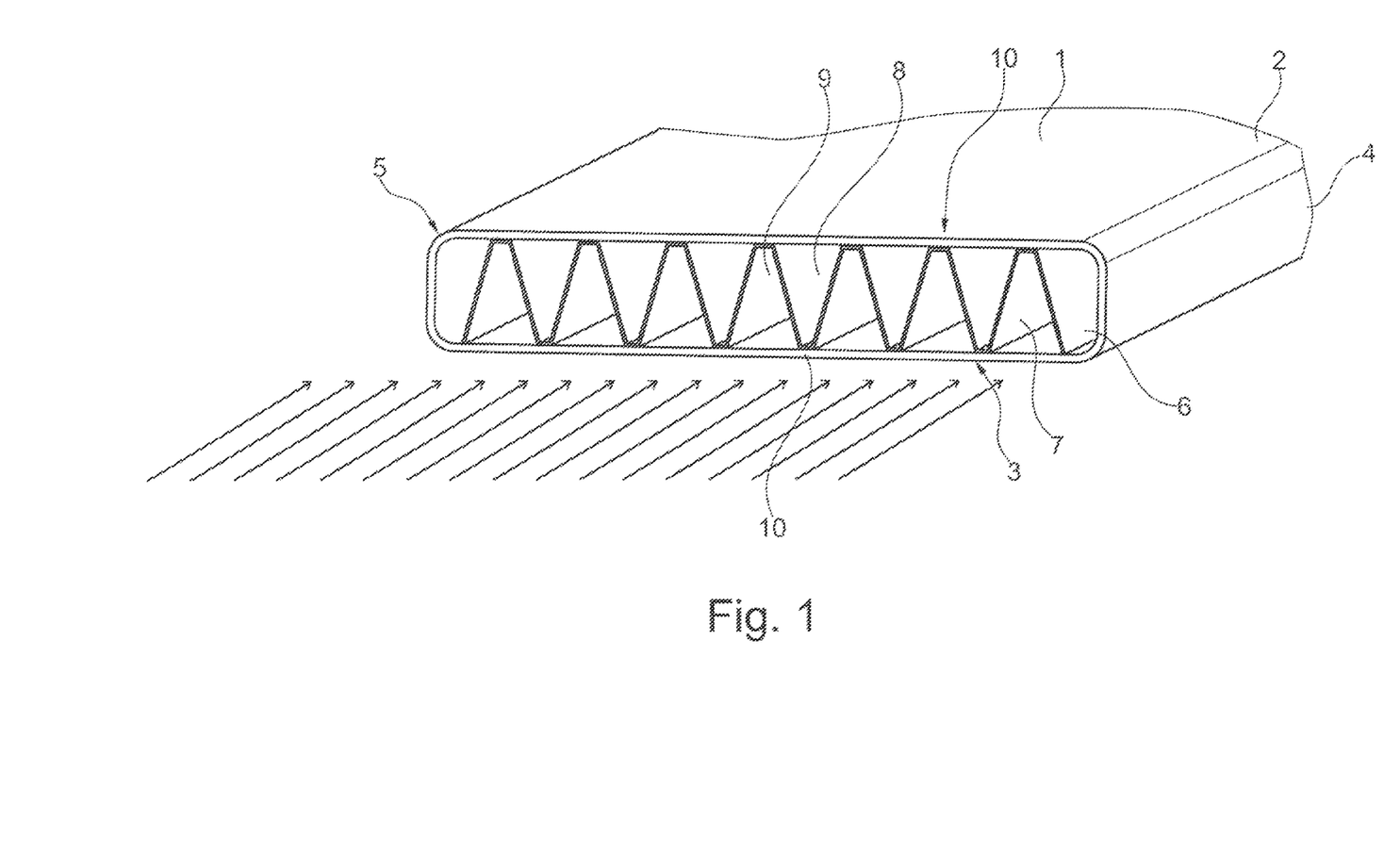
FIG. 1 shows a schematic view of a tube with a corrugated fin.

FIG. 1 shows a tube 1, which is designed as a fluid channel of a heat exchanger, whereby the tube has two wide side surfaces 2, 3 and two narrow side surfaces 4, 5, which lie opposite to each other and define an interior space 6, which is suitable for throughflow for a medium. A corrugated fin 7, formed by fin surfaces 8, 9, each of which is connected together by fin arches 10, is arranged in the interior of tube 1. In this case, fin arches 10 each lie against a side surface 2, 3 of the tube. Fin arches 10 can preferably be soldered to the side surfaces. They can also be applied merely mechanically.

In a further exemplary embodiment, corrugated fin 7 can also be arranged between two tubes, whereby fin arches 10 are each in contact with a side surface of an adjacent tube or connected thereto.

Figure 2:
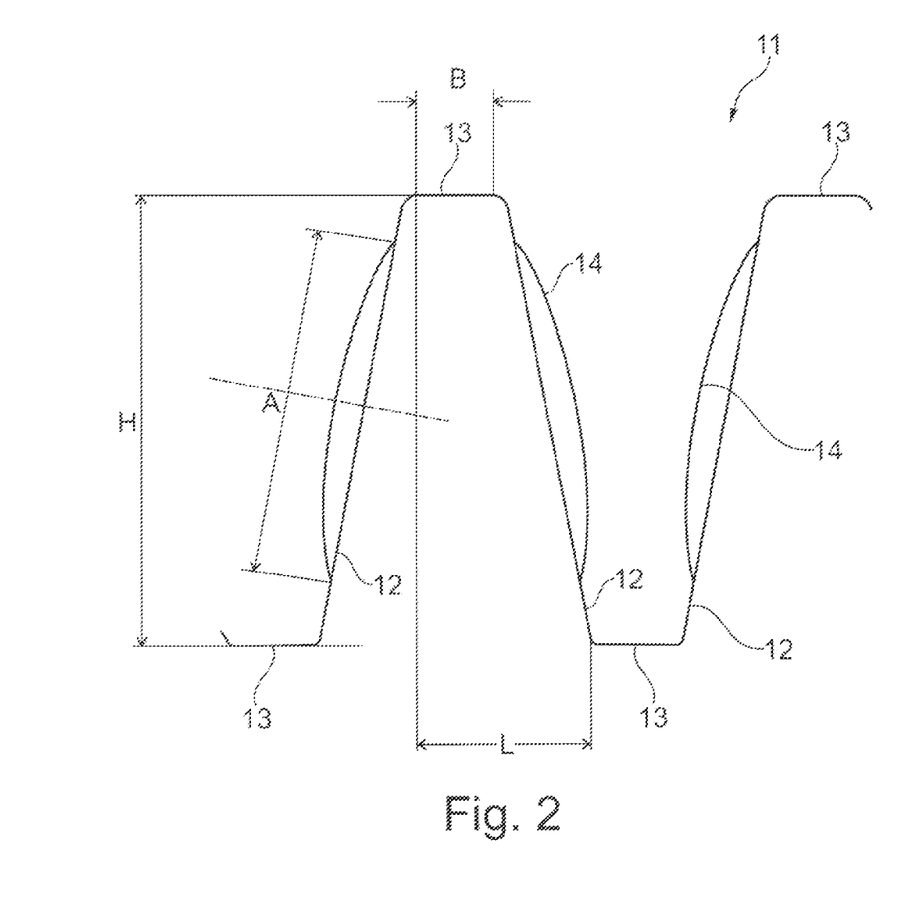
FIG. 2 shows a schematic view of a corrugated fin in section.

FIG. 2 shows a section of a corrugated fin 11 in section, whereby the corrugated fin has fin surfaces 12 and fin arches 13 connecting fin surfaces 12, whereby fin surfaces 12 are inclined in a plane perpendicular to the air flow direction. In this case, the air flow direction in the case of corrugated fin 11 according to FIG. 2 is substantially perpendicular to the plane of the sheet of FIG. 2. Bulges 14, which bulge out of the plane of fin surface 12, are provided in fin surfaces 12. As can be seen, two adjacent fin surfaces 12 together with fin arch 13 form an approximately trapezoidal spatial region, which is available for throughflow of a medium. In this regard, bulges 14 can protrude into this spatial region proceeding from the plane of fin surface 12.

In the exemplary embodiment of FIG. 2, fin arch 13 has a width B, the height of the fin from a fin arch to an opposite fin arch is H, the height of the projection in the plane of the side surface is designated by A, and the distance of two fin arches corresponds to twice the value of L, whereby in FIG. 2 only the value of L is shown as the distance of two opposite fin arches, in the plane perpendicular to the air throughflow direction. The values for a fin are, for example, L=2 to 3 mm, preferably 2.5 mm, H=6 to 8 mm, preferably 7 mm, A=4 to 7 mm, preferably 5.4 mm, B=0.8 to 2 mm, preferably 1.3 mm, and the fin thickness is approximately 0.08 to 0.15 mm, preferably 0.12 mm.

Figure 3:
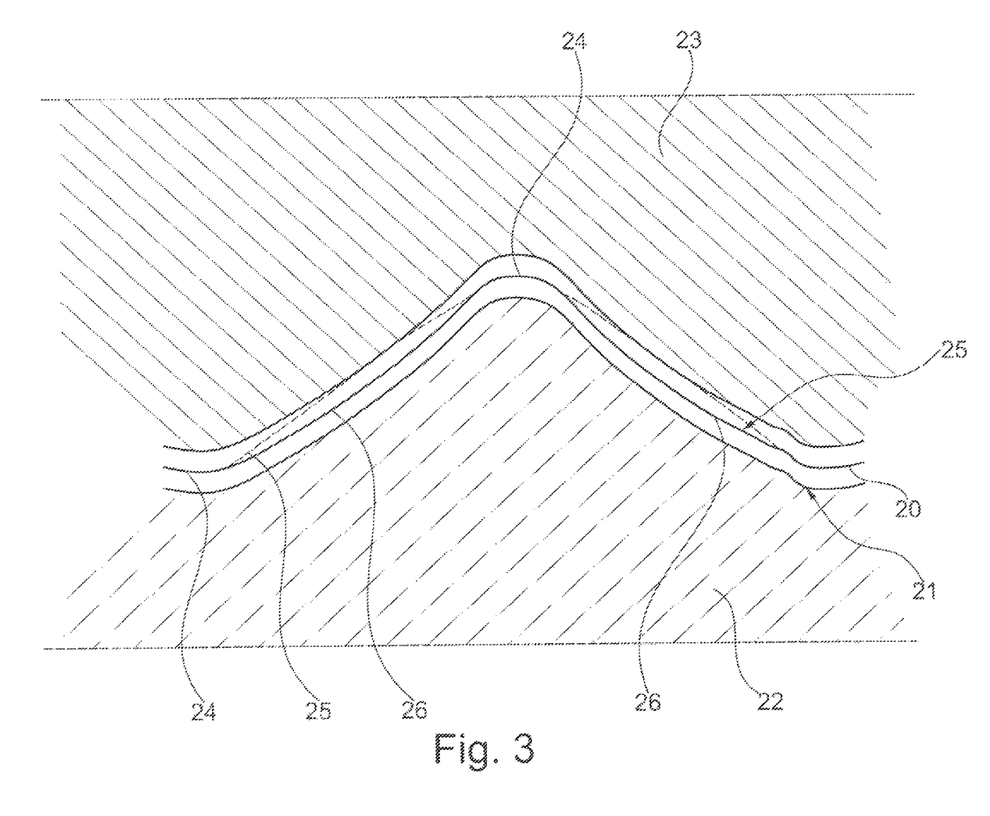
FIG. 3 shows a schematic view of a corrugated fin in a fin rolling machine.

FIG. 3 shows an arrangement of a fin 20 in roller gap 21 of a rolling machine with two rollers 22, 23, whereby it can be seen that fin arch 24 is connected to fin surface 25, which is provided with a projection 26. It can also be seen that the substantially corrugated contour of the fin in a plane perpendicular to the throughflow direction is already created by the rolling.

Figure 4:
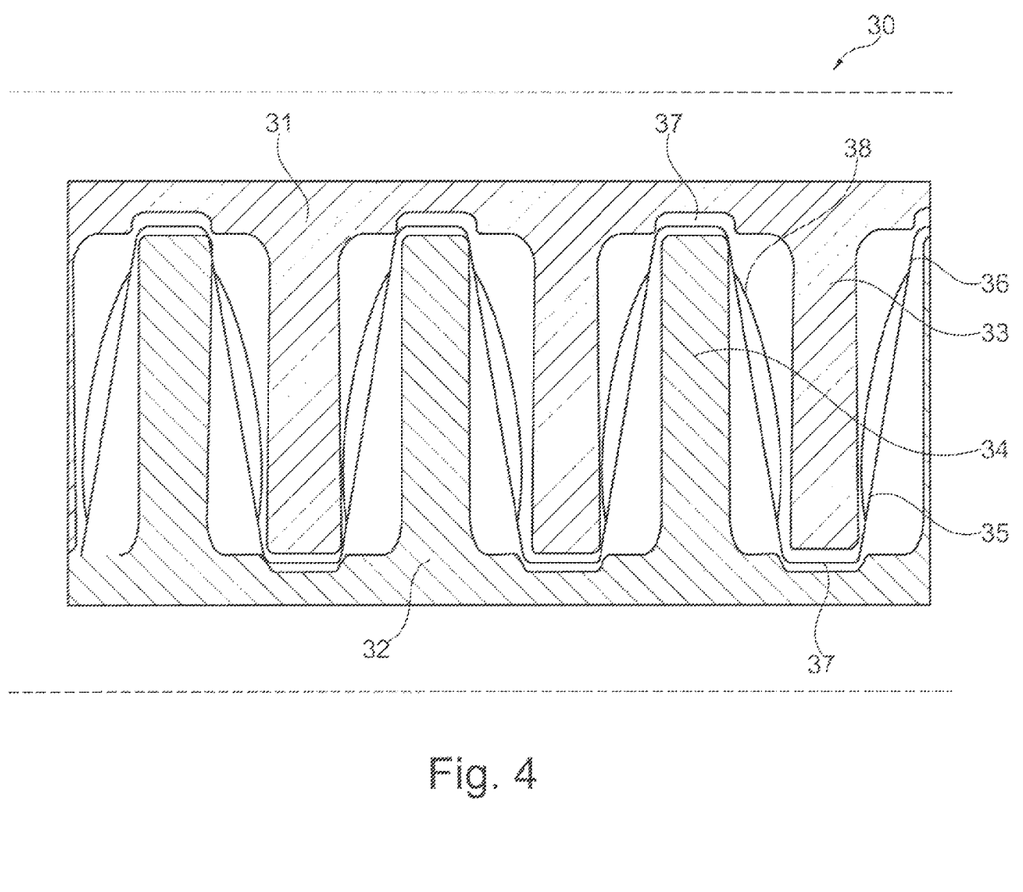
FIG. 4 shows a schematic view of a corrugated fin in a fin rolling machine.

In FIG. 4, a further rolling machine 30 can be seen with rollers 31 and 32, which have regions 33 and 34 interlocking comb-like, whereby corrugated fin 35 is taken up with its fin surfaces 36 in this roller setup. In this case, fin arches 37 are arranged in the head region of comb-like elements 33, 34 in order to form the structure of the corrugated fin, whereby fin surfaces 36 with bulges 38 are arranged between the comb-like elements, whereby the bulges of comb-like elements 33, 34 are spaced apart, so that they are not damaged or destroyed while the fin is being formed.

Figure 5:
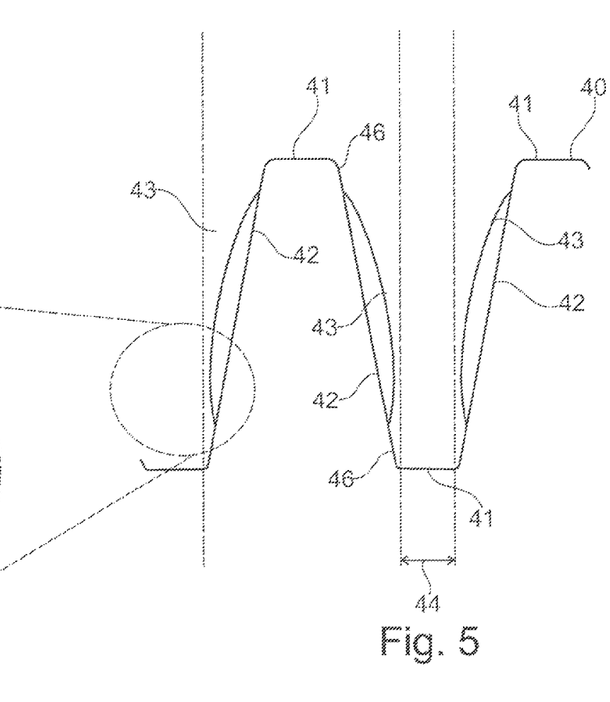
FIG. 5 shows a schematic view of a corrugated fin in section.
Figure 5A:
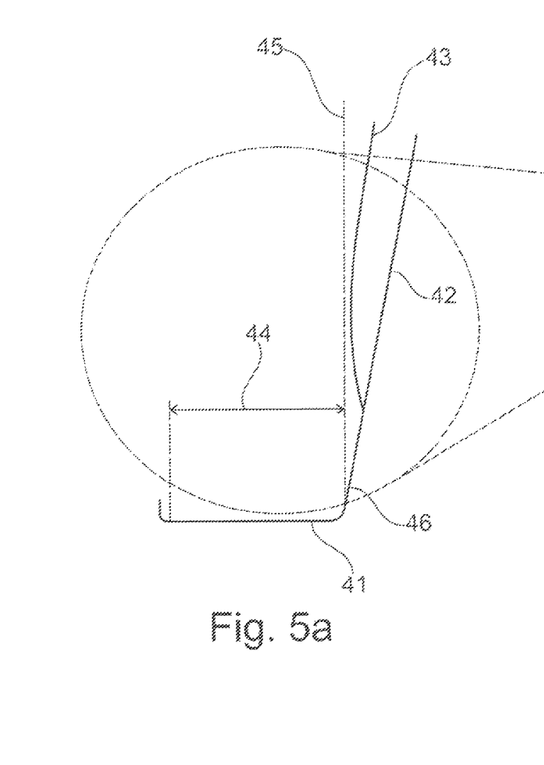
FIG. 5a shows an exploded section of FIG. 5.

FIG. 5 shows a corrugated fin 40 with fin arches 41 and fin surfaces 42 and bulges 43 of fin surfaces 42. It can be seen in this case that spatial region 44 defined by the width of fin arch 41 is kept clear by bulges 43. The detail in FIG. 5a shows this once again in an enlargement. Here, bulge 43 is created in fin surface 42 such that it does not protrude beyond line 45 in order to enter the spatial region of fin arch 41, which is defined by width 44. This is achieved in that bulge 43 is not provided in the lower or upper end region of fin surface 46, but begins spaced apart from the fin arch from the transitional region or end region of the fin surface. Region 46 thus serves as a gap to achieve that bulge 43 does not enter the region designated by 44.

Figure 6:
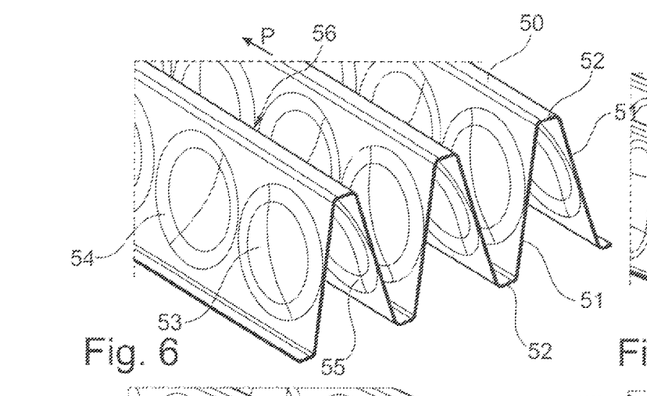
FIG. 6 shows a perspective view of a corrugated fin.

FIG. 6 shows a corrugated fin 50 with fin surfaces 51, which run substantially along an air flow direction according to arrow P, whereby fin surfaces 51 are arranged in a V-shaped or trapezoidal fashion angled to one another. Fin surfaces 51 are connected together by fin arches 52 in such a way that two fin surfaces 51 are always connected together at an end via a fin arch 52, whereby fin surfaces 51 are typically connected at both ends via a fin arch 52 to another fin surface 51. Projections 53, 54, which are curved outward or inward substantially in the manner of a circle or spherical shell, are provided in fin surfaces 51. In this regard, projections 53 and 54 are curved in an opposite direction, so that the elements are curved alternating relative to one another. It can be seen that projection 53 and projection 55 of two opposite fin surfaces are arranged such that the projection is oriented in the opposite direction, so that they point away from one another. Adjacent projections 54 and 56, whereby projection 56 cannot be seen in FIG. 6, are curved inwardly toward one another, however, so that they enter the spatial region that exists between the two adjacent fin surfaces 51.

As can be seen in FIG. 6, projections 53, 54 and 55, 56 alternate in the lengthwise direction of the fin surfaces, whereby the structure of the embossing is the same in every second fin surface.

Figures 7, 9:
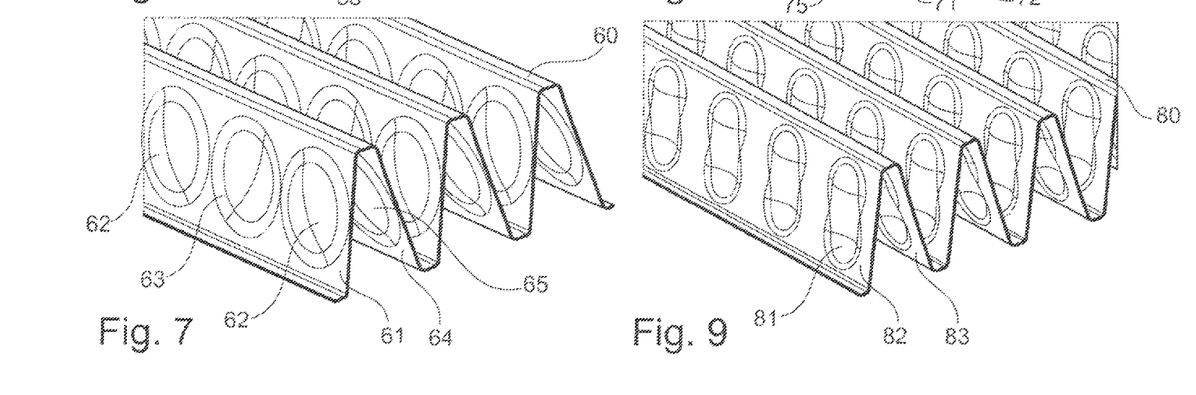
FIG. 7 shows a perspective view of a corrugated fin.
FIG. 9 shows a perspective view of a corrugated fin.

FIG. 7 shows a further exemplary embodiment of a fin of the invention, in which the projections of fin 60 along a fin surface 61 are always formed alternatingly, so that projections 62 are embossed toward one side and projections 63 lying therebetween are embossed in the opposite direction.

In the adjacent fin surface 64, curvature 65 is embossed in the same direction as curvature 62, so that the curvatures with the same distance from the front edge always point in the same direction when viewed in the air flow direction. Alternating orientations of the curvatures at the same height always point in the same direction and no curvatures of adjacent fin surfaces are present that point toward or away from one another, but always point in the same direction.

Figures 8, 8A:
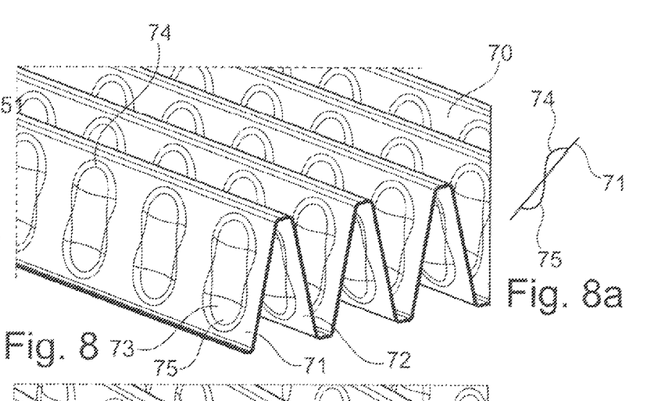
FIG. 8 shows a perspective view of a corrugated fin.
FIG. 8a shows a section through a bulge.

FIG. 8 shows projections which are formed elongated or oval. To this end, a series of projections 73, which in the top region 74 are curved outward and in the bottom region 75 are curved inward, is introduced in fin 70 in fin surface 71 or 72. This means that the projections are formed S-shaped, whereby the S in the area of its center line cuts the plane of the fin surface and in the top region faces outward and in the bottom region faces inward, so that two projections are produced, which are connected by a straight boundary surface. In contrast, the projections of FIG. 6 or 7 are arranged and formed separately from one another, whereby a planar region of the fin surface surrounds such a curved region and two projections are separated from one another. In the exemplary embodiment of FIG. 8, the indicated S-shaped embossings are also separated from one another by a planar region of the fin surface, whereby the S-shaped embossings can also be defined as two embossings with a straight line-like connection. FIG. 8a shows a section through a projection 74, 75, which is formed S-shaped relative to fin surface 71.

It can be seen in FIG. 8 that the projections of adjacent fin surfaces are formed with an opposite curvature; this means that projections 74, which point away from the adjacent fin surface, find their counterpart in the adjacent fin surface and these projections there also point away from the first fin surface. Projections 75, those of the first fin surface pointing toward the adjacent fin surface, find their counterpart in the adjacent fin surface such that the related embossing also points to the first fin surface.

Adjacent projections along the extension of fin surface 71 are oriented parallel to one another and formed with the same orientation of the projections. This means that all projections in the top region are curved outward and the [curvatures] in the bottom region inward.

FIG. 9 shows a further exemplary embodiment in which projections 81 of fin surfaces 82 of fin 80 in adjacent fin surfaces 82, 83 are embossed in a different direction in such a way that projections embossed in first fin surface 82 in the top region point outward and the embossing in adjacent fin surface 81 in the top region point inward, therefore toward adjacent fin surface 81, whereas in first fin surface 81 the projections are arranged in the top region, which point away from second fin surface 81. Accordingly, the opposite applies to the bottom regions, so that in the bottom region the projections of first fin surface 81 point toward second fin surface 81, whereby the projections of second fin surface 81 point away from the first fin surface. Along a fin surface 81, the adjacent projections are again formed identically in the same direction, whereby the projections are formed oval and elongated and oriented substantially perpendicular to the air flow.

Figure 10:
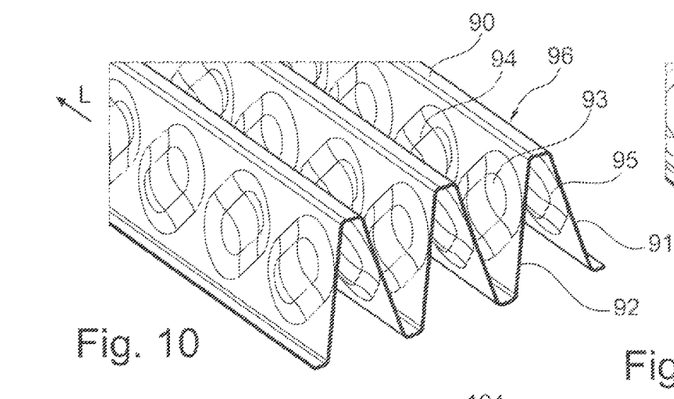
FIG. 10 shows a perspective view of a corrugated fin.
Figure 11:
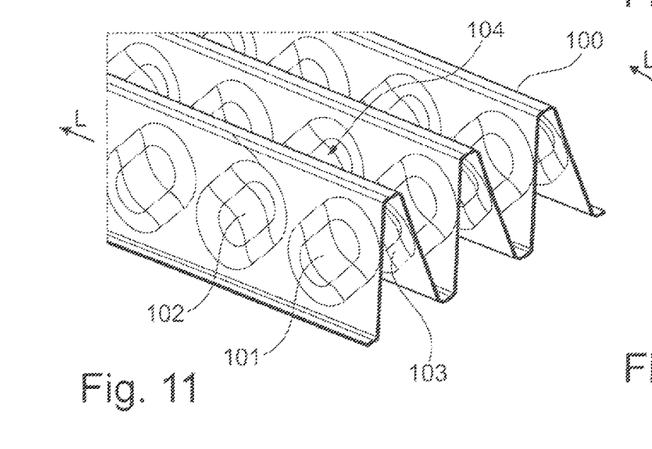
FIG. 11 shows a perspective view of a corrugated fin.

FIGS. 10 to 13 show exemplary embodiments of corrugated fins with oval embossings, whereby in FIGS. 10 and 11 the embossings are arranged at an angle, when viewed relative to the air flow direction L, whereby the angle of the orientation of the embossings is the same in each case.

A corrugated fin 90 with fin surfaces 91, 92 can be seen in FIG. 10, whereby embossings 93, 94 are provided. Embossings 93 of side surface 92 is curved counter to the direction to side surface 91 and projection 94 is curved in the direction to side surface 91. Projection 95 of side surface 91, in contrast, is curved in the direction to side surface 92, and the adjacent projection 96 (which cannot be seen) is curved in the direction so that it points away from fin surface 92. This means that the projections that are arranged as the next ones from the front edge all point toward the left, the second projections, when viewed in the air flow direction, all point toward the right, and the third projections then again point to the left, etc.

In FIG. 11 projections 101 are arranged in fin 100, which are embossed alternating in relation to projections 102, and are embossed at an angle of approximately 45° to the air flow direction L. The projections of adjacent fin surfaces are embossed oppositely, which means that adjacent embossings on adjacent fin surfaces are embossed either toward or away from one another. Projection 103 is therefore embossed oppositely to projection 101. The embossing 104 (not shown) which is adjacent to [projection] 103 is oriented toward embossing 102, so that both embossings 102 and 104 are embossed toward one another.

Figure 12:
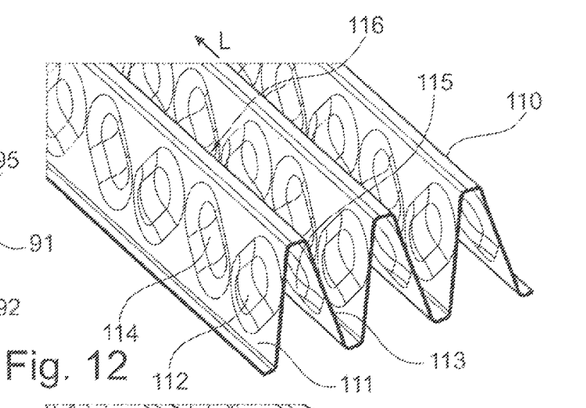
FIG. 12 shows a perspective view of a corrugated fin.
Figure 13:
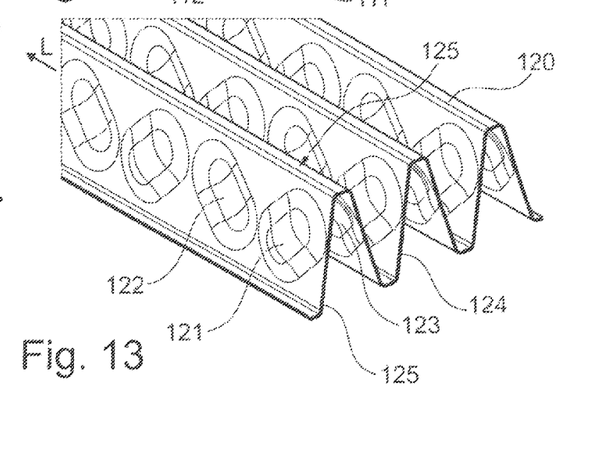
FIG. 13 shows a perspective view of a corrugated fin.

FIGS. 12 and 13, in contrast to FIGS. 10 and 11, show projections in corrugated fins which are oriented relative to one another at a different angle to the air flow direction. In this case, the first projections are embossed which are arranged at an angle of approximately 45° to the air flow direction, whereby adjacent projections are embossed at an angle of approximately 135° to the air flow direction. The direction of the embossing corresponds to the directions in FIGS. 10 and 11, which means that in FIG. 12 fins 110 in side surface 111 have a projection 112 that is oriented away from fin surface 113, whereby adjacent projection 114 is embossed toward fin surface 113. Projection 115 of fin surface 113 is embossed toward fin surface 111, whereby the adjacent projection 116 (not shown) of fin surface 113 is oriented away from fin surface 111.

Instead of an angle of 45° or 135°, other complementary angles can also be provided., It is expedient in this case, if the sum of the angles corresponds to 180°, when the angles of two adjacent projections are added.

FIG. 13 shows a corrugated fin 120, in which adjacent projections 121, 122 are arranged alternating in their curvature direction, whereby adjacent projections of adjacent fin surfaces are also embossed in the opposite direction. This means that projection 123 of fin surface 124 is curved away from fin surface 125, whereas projection 121 is also curved away from fin surface 124. Adjacent projections 122 and 125, which are arranged on fin surface 124 next to projection 123, in contrast, are curved toward one another. In the illustrations of FIGS. 10 to 13, adjacent projections are embossed alternating in a fin surface, whereby in FIGS. 12 and 13 the angles of the orientation of the longitudinal axis of the projections are shown at a different angle.

Figure 14:
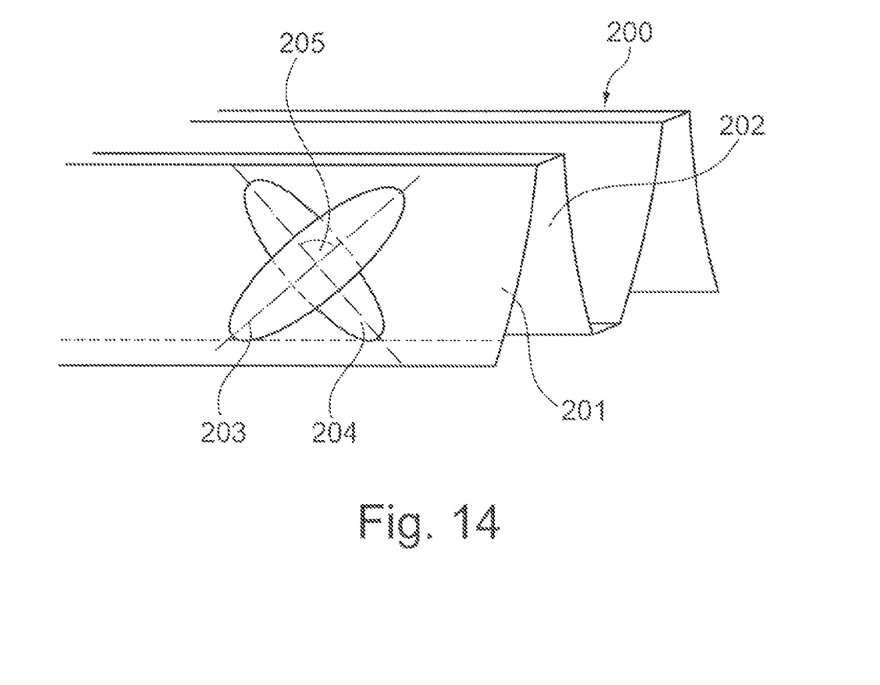
FIG. 14 shows a partial view of a corrugated fin.
Figure 15:
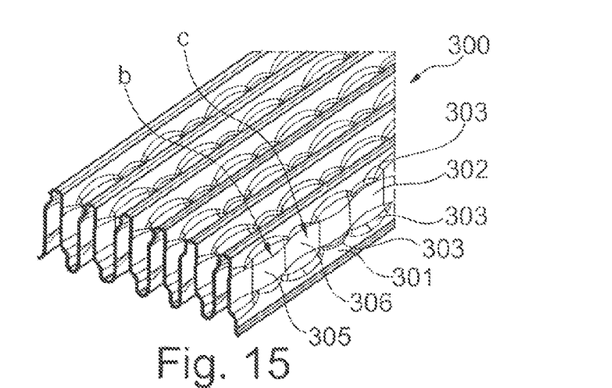
FIG. 15 shows a perspective view of a corrugated fin.
Figure 16:
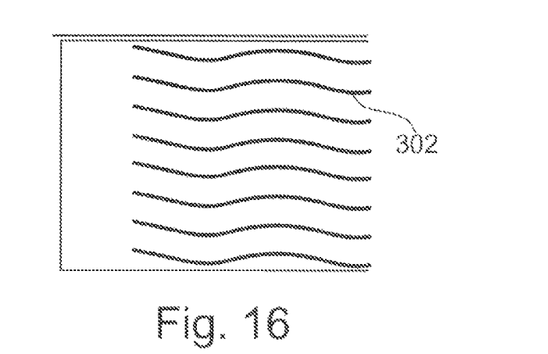
FIG. 16 shows a view of a corrugated fin from above.

FIG. 14 shows schematically a view of a corrugated fin 200 with two adjacent fin surfaces 201, 202. In this case, projections 203, 204 can be seen on both adjacent fin surfaces 201, 202, which are embossed at an angle 205 to one another. Advantageously, projections 203, 204 are embossed so that the projections of adjacent fin surfaces are arranged and oriented crosswise. Here, angle 205 can be approximately 90°. However, other angles different therefrom can also be provided such as, for example, 120°.

FIGS. 15 to 18 show a further exemplary embodiment of a corrugated fin 300 of the invention, in which on opposite fin surfaces 301 a corrugated embossing 302 is provided running along the fin surface. Corrugated embossing 302 modulates the fin surface perpendicular to the air throughflow direction. Above and below the corrugated embossing 302 arcuate embossings 303, 304 are provided, which surround the corrugated embossing above and below and form a band that runs parallel to the corrugated embossing.

Corrugated embossing 302 thereby forms bulges 305, 306 that extend transverse to the air throughflow direction in alternating directions.

The bulges in the same embossing direction are arranged every 7 mm to 20 mm, preferably 10 mm, so that a related periodicity is produced. As a result, the medium, such as air, is conducted in wavy lines through the fin. Thus, the bulges point alternatingly in opposite directions.

Arcuate embossings 303, 304 above and below corrugated embossings 302 are also executed with this periodicity.

Figure 17:
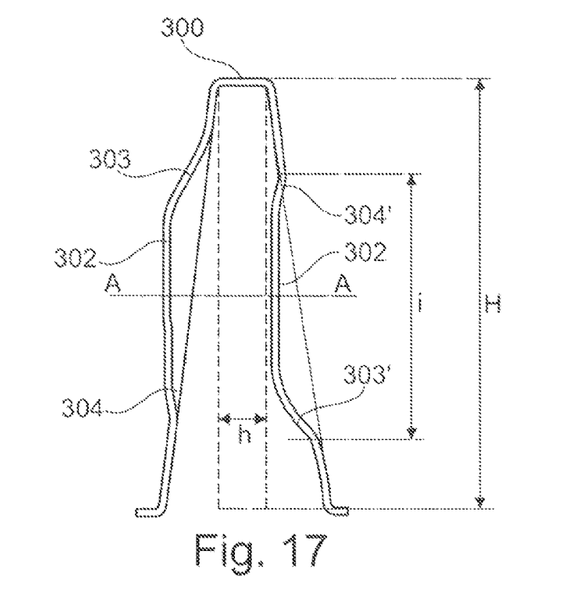
FIG. 17 shows a section through a corrugated fin.
Figure 18:
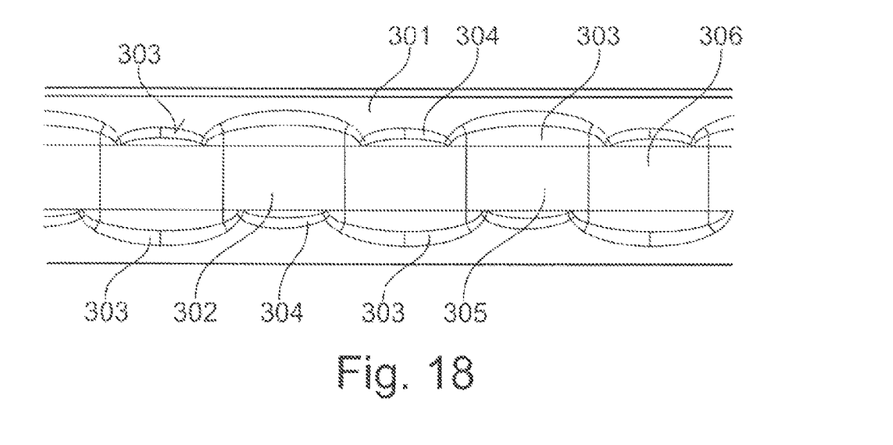
FIG. 18 shows a corrugated fin in a view of a fin surface.

The bulge depth of corrugated embossings 302 and arcuate embossings 303, 304 is variable and not constant over the height of the fins, as can be seen in FIG. 17.

Bulge 303, 304 out of the trapezoidal surface of the fins is smaller in the region of trapezoid base 304 than in the region of trapezoid top 303, but at most so large that the free passage h is 0.5 mm to 1.5 mm, preferably 0.8 mm.

The embossing having a different depth is used for minimizing a bypass in the frustum region.

A bulging into the trapezoidal surface is greater in the region of trapezoid base 303' than in the region of trapezoid top 304', but at most so large that the free passage h is 0.5 mm to 1.5 mm, preferably 0.8 mm.

The different depth of the embossing is used for minimizing a bypass in the frustum region.

The bulge height i is preferably between 60% and 95% of the fin height H, preferably 80%.

Figure 19:
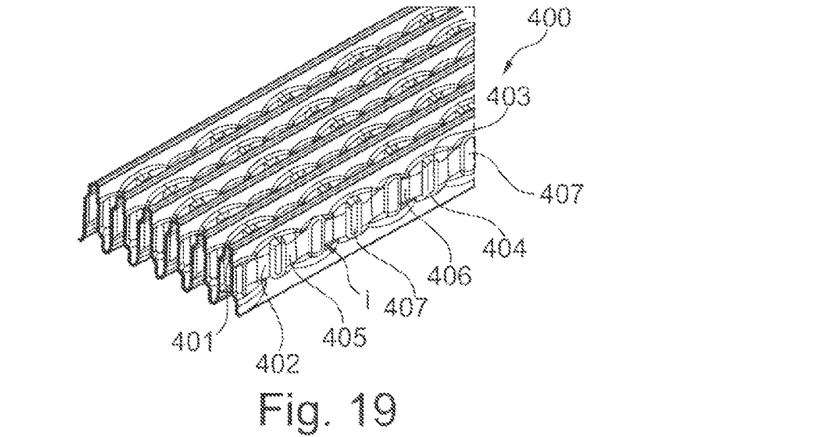
FIG. 19 shows a perspective view of a further corrugated fin.
Figure 20:
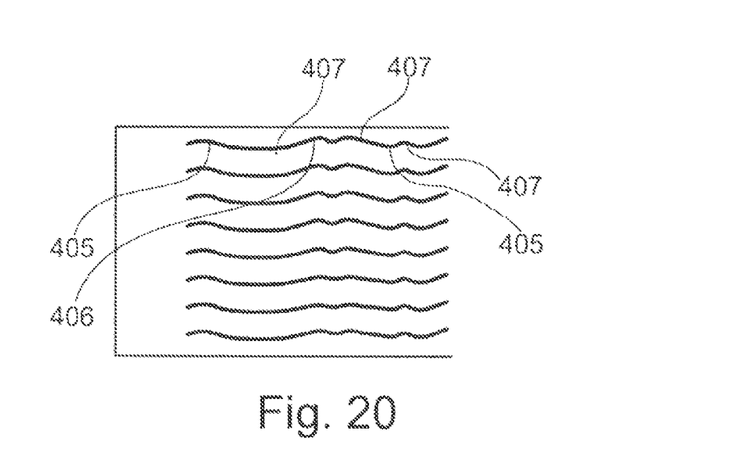
FIG. 20 shows a view of the corrugated fin according to FIG. 19 from above.
Figure 21:
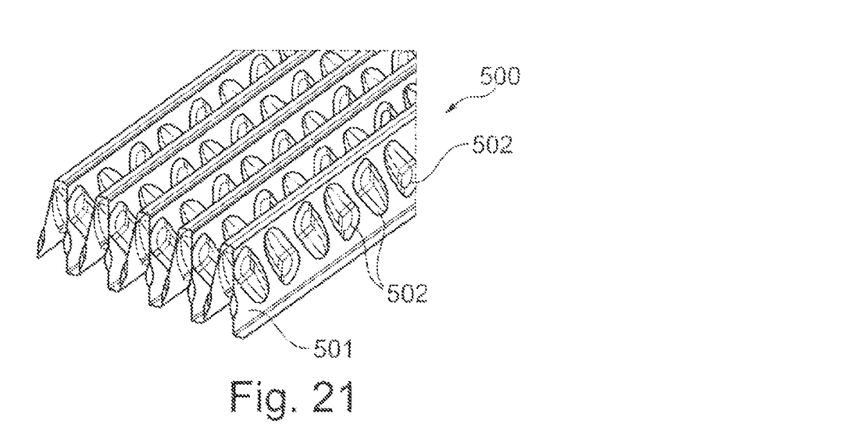
FIG. 21 shows a perspective view of a further corrugated fin.
Figure 22:
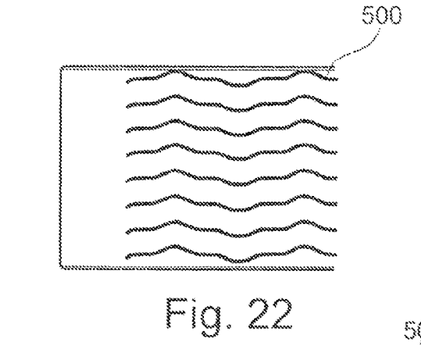
FIG. 22 shows a view of the corrugated fin according to FIG. 21 from above.

FIGS. 19 and 20 show a further exemplary embodiment of a corrugated fin 400 of the invention, in which on opposite fin surfaces 401 a corrugated embossing 402 is provided, which runs along the fin surface. Corrugated embossing 402 modulates the fin surface perpendicular to the air throughflow direction. Above and below the corrugated embossing 402 arcuate embossings 403, 404 are provided, which surround the corrugated embossing above and below and form a band that runs parallel to the corrugated embossing. Corrugated embossing 302 thereby forms bulges 405, 406, which extend transverse to the air throughflow direction in alternating directions.

The medium is conveyed in a wavy manner in the flow direction by corrugated embossing 402 with bulges 403, 404, whereby in each trough and peak of bulges 405, 406 a counter-bulge 407 is formed, which increases the turbulence in the channel and thereby the heat transfer.

Counter-bulge 407 is embossed into the depth between 10% and 60% of the original bulge 405, 406, preferably approximately 40%.

FIGS. 21 to 24 show a further exemplary embodiment of a corrugated fin 500 of the invention, in which on opposite fin surfaces 501 oval embossings 502 are provided, which are arranged spaced apart along the fin surface. Oval embossings 502 modulate the fin surface perpendicular to the air throughflow direction. Embossing 502 thereby forms bulges which extend transverse to the air throughflow direction in alternating directions.

The oval embossings thus form bulges, which project alternatingly into the trapezoid base-shaped cross section of fin 500 and out of the trapezoid base-shaped cross section of fin 500.

The oval embossings form elongated oval bulges, whose longitudinal direction is inclined at an angle of $0° < \alpha < 90°$, preferably $35° < \alpha < 70°$, to the flow direction. The oval embossings have a narrow end region, which has a more circular shape and a further narrow end region, which is rather acute.

Figure 23:
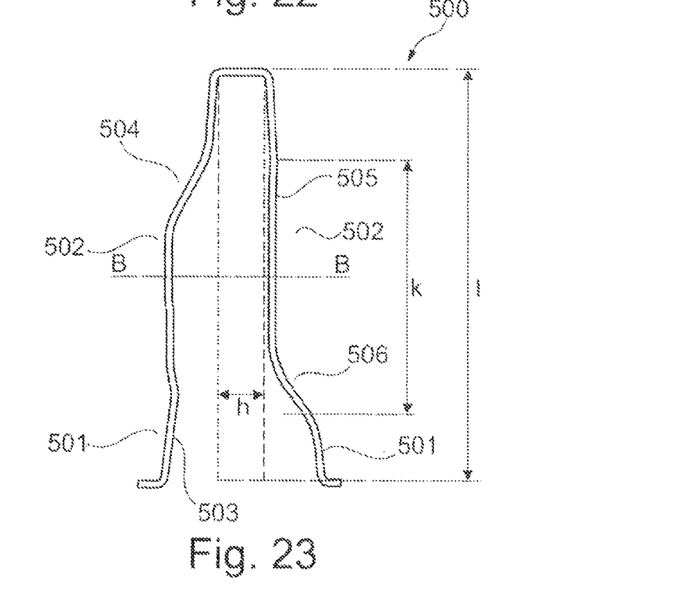
FIG. 23 shows a section through a corrugated fin according to FIG. 21.
Figure 24:
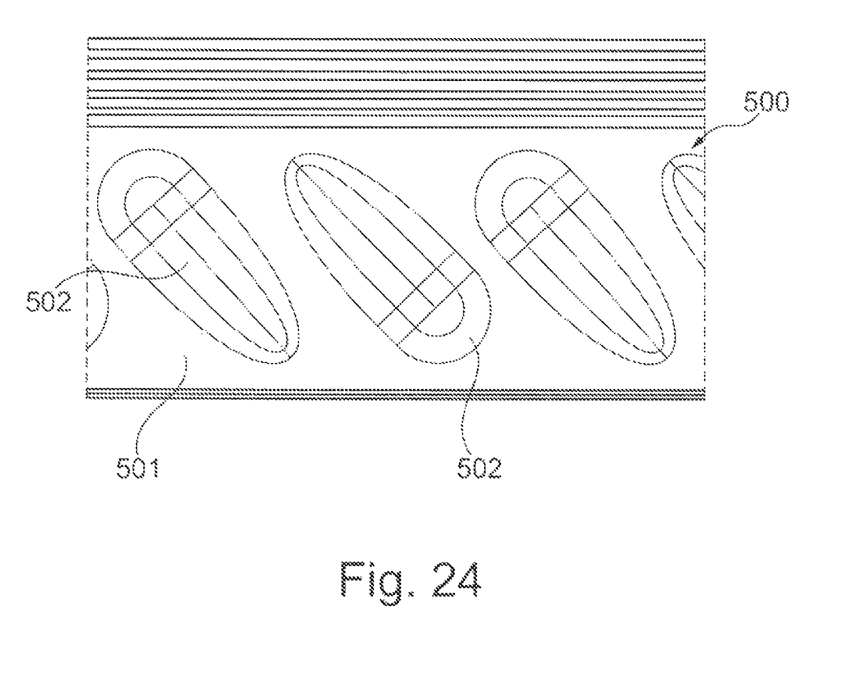
FIG. 24 shows a view of the corrugated fin on a fin surface.

The bulge depth and width along the bulge shape of the embossing are not constant relative to surface 501; see FIG. 23. The bulge out of the trapezoidal shape is smaller in the region of trapezoid base 503 than in the region of trapezoid top 504, but at most so large that the free passage h is 0.5 mm to 1.5 mm, preferably 0.8 mm. The embossing having a different depth is used for minimizing a bypass in the frustum region.

The bulge into the trapezoidal shape is smaller in the region of trapezoid top 505 than in the region of trapezoid base 506, but at most so large that the free passage h is 0.5 mm to 1.5 mm, preferably 0.8 mm. The embossing having a different depth is used for minimizing a bypass in the frustum region.

Bulge height k corresponds to between 60% and 95% of fin height I, preferably 80%.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A corrugated fin for a heat exchanger with a substantially corrugated design, the corrugated fin comprising:
a plurality of fin surfaces, wherein adjacent fin surfaces are connected to one another via a fin arch such that a medium is adapted to flow through an intermediate space between adjacent fin surfaces, wherein the fin surfaces are arranged at an angle with respect to one another perpendicular to a throughflow direction for the medium; and
at least one bulge arranged on the fin surface, the at least one bulge protruding out of a plane of the fin surface, wherein an extent of the bulge in a direction perpendicular to the air throughflow direction is smaller than an extent of the fin surface in the direction,
wherein the bulge is formed as a corrugated embossing on one or on opposite fin surfaces,
wherein an arcuate embossing is provided on the fin surface, the arcuate embossing surrounding the corrugated embossing above and below, such that the arcuate embossing is provided above and below the corrugated embossing,
wherein, in the air throughflow direction, the arcuate embossing extends as a continuous band above and a continuous band below the corrugated embossing,
wherein, in the air throughflow direction, the arcuate embossing alternates between a first size arcuate embossing and a second size arcuate embossing, the first size arcuate embossing being larger than the second size arcuate embossing, and
wherein each of the first size arcuate embossing and the second size arcuate embossing have an arc shape, such that the first size arcuate embossing and the second size arcuate embossing of the continuous band extending above the corrugated embossing each create a convex curve in a direction towards the fin arch provided at an upper edge of the fin surface, and the first size arcuate embossing and the second size arcuate embossing of the continuous band extending below the corrugated embossing each create a convex curve in a direction towards the fin arch provided at a lower edge of the fin surface.

2. The corrugated fin according to claim 1, wherein the bulge is spaced apart from an end region of the fin surface, which is adjacent to a fin arch, or from both end regions of the fin surface, said region each adjacent to a fin arch.

3. The corrugated fin according to claim 1, wherein a plurality of bulges are formed and arranged per fin surface, and wherein a first portion of bulges of a fin surface protrude toward a first side and a second portion of bulges protrude toward a second side with respect to the plane of the fin surface.

4. The corrugated fin according to claim 3, wherein the first and second portion of bulges touch one another or merge into one another.

5. The corrugated fin according to claim 1, wherein the corrugated embossings on opposite fin surfaces are formed projecting in the same direction.

6. The corrugated fin according to claim 1, wherein the corrugated embossing extends along the fin surface in the flow direction.

7. The corrugated fin according to claim 1, wherein the corrugated embossing modulates the fin surface perpendicular to the flow direction.

8. The corrugated fin according to claim 1, wherein the arcuate embossings form a band, running parallel to the corrugated embossing.

9. The corrugated fin according to claim 1, wherein a bulge depth of the corrugated embossings and the arcuate embossings is formed constant or variable over the height of the fin.

10. The corrugated fin according to claim 1, wherein a bulge out of a trapezoidal fin surface in a region of a trapezoid base is smaller than a bulge in a region of a trapezoid top.

11. The corrugated fin according to claim 1, wherein a bulge into a trapezoidal fin surface in a region of a trapezoid base is larger than a bulge in a region of a trapezoid top.

12. The corrugated fin according to claim 1, wherein a bulge height is between 60% and 95% of the fin height or wherein the bulge height is 80% of the fin height.

13. The corrugated fin according to claim 1, wherein a counter-bulge is formed in at least one or in each trough or peak of the corrugated embossing.

14. A heat exchanger having fluid channels with side surfaces of the fluid channels, with spatial regions between adjacent side surfaces, wherein a corrugated fin according to claim 1 is arranged between adjacent side surfaces such that it lies against one of the side surfaces via opposite fin arches.

15. The corrugated fin according to claim 1, wherein the arcuate embossing merges into the corrugated embossing.

* * * * *